D. URCH.
TIRE PROTECTOR.
APPLICATION FILED JAN. 23, 1917.
1,263,295.
Patented Apr. 16, 1918.
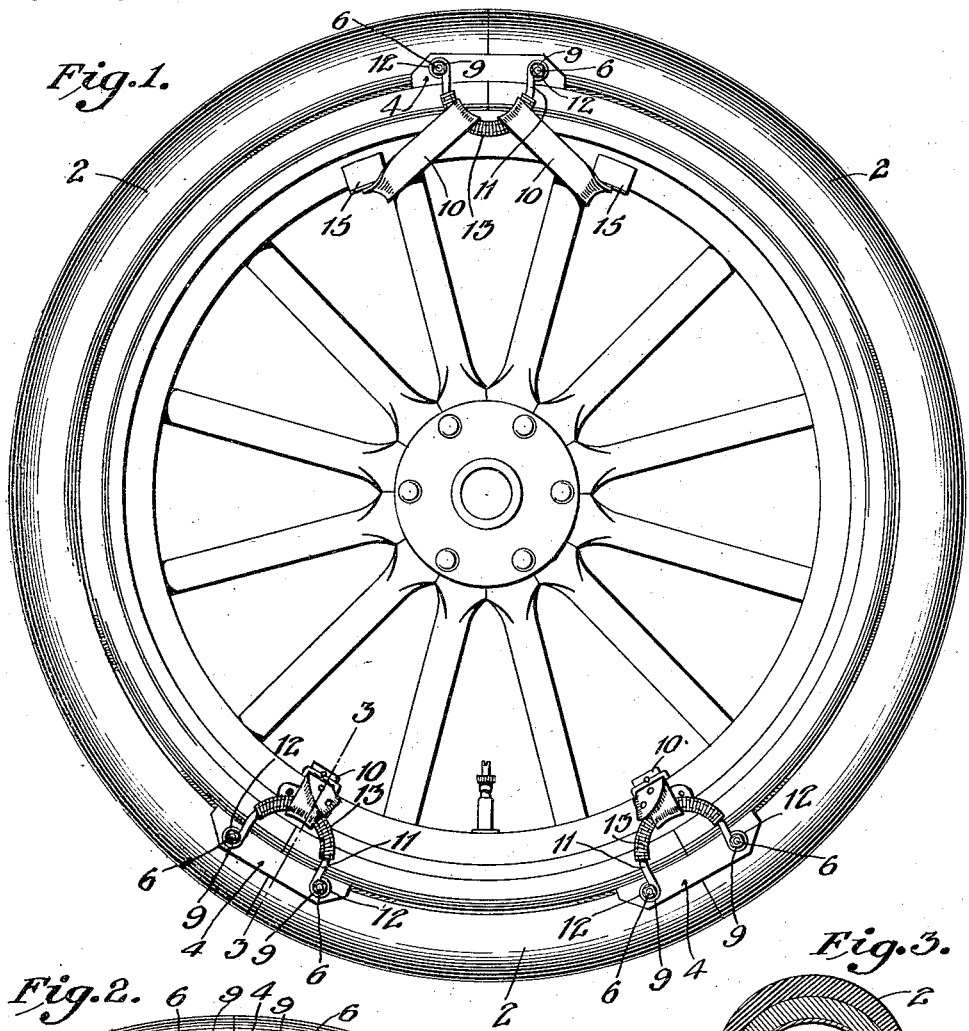
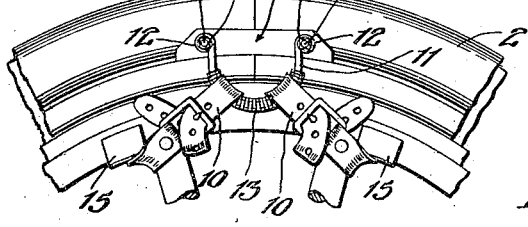
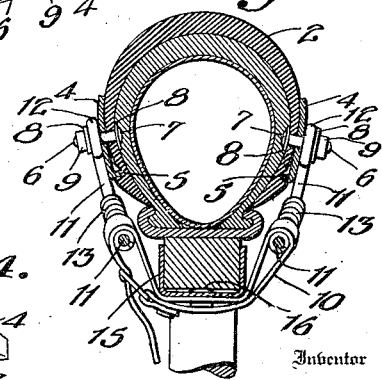
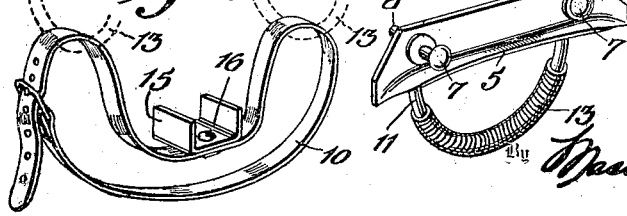
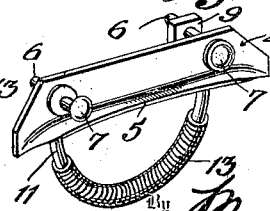
Inventor
David Urch

UNITED STATES PATENT OFFICE.

DAVID URCH, OF PORTSMOUTH, NEW HAMPSHIRE, ASSIGNOR OF ONE-HALF TO ELMER E. TUCKER, OF ELIOT, MAINE.

TIRE-PROTECTOR.

1,263,295.

Specification of Letters Patent.  Patented Apr. 16, 1918.

Application filed January 23, 1917.  Serial No. 144,024.

*To all whom it may concern:*

Be it known that I, DAVID URCH, a citizen of the United States, residing at Portsmouth, in the county of Rockingham and State of New Hampshire, have invented certain new and useful Improvements in Tire-Protectors; and I do hereby declare the following to be a full, clear, and exact description of the invention, such as will enable others skilled in the art to which it appertains to make and use the same.

This invention relates to tire protectors, and more particularly to a tire protector or covering which is composed preferably of sections or segments of tire casing of the usual type utilized in the structure of pneumatic tires.

A particular object of the present invention is to provide an improved tire protector which will enable the use of sections of new or used tire casings, and further has for its object to provide means for efficiently and securely fastening these sections in a substantially complete circle about the tire to be protected.

I have found by actual practice that slightly worn or mutiliated or defective tire casings may be utilized with great efficiency in the protection of the usual outer casings of pneumatic tires of vehicle wheels, and my present invention consists in the utilization of these sections of worn or damaged tires and if necessary provides for the use of sections of new tires, when such practice would be economical, and further consists in the means for securely drawing the sections of the protector or covering of the tire into position about the casing of the tire to be protected in place on a wheel.

With these and other objects in view, the present invention is described in the following specification, and one of the embodiments thereof is illustrated in the accompanying drawing in which:

Figure 1 is a side elevation of a wheel having the improved sectional protector in place, and illustrating means for securing the tire protector in position thereon.

Fig. 2 is a view in side elevation of a fragment of the wheel shown in Fig. 1, taken from the opposite side thereof to show the manner of connection of the fastenings of the protector of the wheel.

Fig. 3 is a cross sectional view on line 3—3 of Fig. 1, and

Fig. 4 is a detail, perspective view of one of the clamping or tie plates detached from the wheel.

Fig. 5 is a perspective view of one of the detached fastening straps showing the clip attached thereto for embracing the wheel felly.

The present invention is designed particularly to provide for the use and complete wearing out of sections of old, or damaged, or inferior tire casings, it being understood that these sections may be cut from the old or damaged tire at such points as to secure the most perfect segment thereof, and preferably the old tire will be of such size that when fitted to the tire to be protected the marginal edges or the rim beads of the tire will overlap the sides of the casing to be protected in position on the wheel with the several sections of the protector so cut that they will form a complete or substantially complete circle about the casing to be covered, and thus shield and protect the latter against wear.

One of the features of my invention, in addition to the utilization of sections of old or damaged tires, is in the arrangement and design of the means for securing the ends of the segments of the covering in firm, abutting position, and in such manner that these means are substantially protected against contact with the roadway so that they may be used repeatedly after their removal from one set of sections forming a tire covering when this has been worn out.

In the drawings I have shown a tire covering consisting of a series of sections 2—2 which are here shown as three in number, although it is understood that the number of sections may be varied according to the length of the pieces utilized in the construction of the covering or protector according to the condition of the old tires or casings from which the segments or sections are cut.

Tire sections having been selected which are of approximately the interior contour and size to snugly embrace the tire in position on the wheel structure, these are then adapted to be connected together at their abutting ends by suitable means, whereby when the ring of sections is applied to the casing to be protected the ring may be securely fastened in position to envelop the casing at its tread and side portions to protect the same and to hold the cover or protector against circumferential movement relative to the inflated tire on the wheel.

A suitable and practicable and very inexpensive form of fastening device for securing the ends of the sections of the cover to each other, and also for attaching them readily and securely to the wheel, is shown in the present instance as comprising a pair of duplicate and reversible or interchangeable plates 4 of suitable length, thickness, and height, these plates being here shown as of L shape in cross section so as to provide a short flange 5 along one side, which flange is slightly curved in elevation so as to fit into the rim groove or seat 3 of the tire sections 2 forming the covering of the tire.

The tie plates 4 are perforated near their ends and adapted to receive fastening devices such as bolts 6 having at their inner ends heads 7 adapted to bear against the inside of the flanges or rim portion of each section, and if desired washers 8 may be mounted on the bolts 6 to bear against the heads 7 thereof and thus increase the area of contact and support of the section of tire, as shown in Fig. 3.

In assembling the cover the sections are brought with their ends in juxtaposition and the bolts 6 are passed through perforations made therein and then through the respective apertures in the ends of the plates 4, these plates thus being arranged in pairs, one on each side of the joint formed by the abutment of the sections, and then by tightening up nuts 9 on the outside of the plates these latter are secured rigidly and firmly to the ends of the sections of the cover to hold these against displacement relatively, and the bolts may be utilized as means for connection to the plates of suitable tensioning devices whereby the cover may be drawn snugly into position about the tire to be protected on the wheel.

The tensioning means for so mounting the sectional cover on the tire is here shown as comprising a set of straps 10 of which a suitable number may be provided to be connected to each pair of tie plates 4 at the juncture of the sections, and for the purpose of providing a connection between the straps 10 and their respective pair of plates there may be mounted upon the bolts 6 at the outside of the plates 4 a U-shaped or stirrup-like member 11 having eyes 12 to fit over the respective bolts 6, the stirrups being so disposed that their yokes project inwardly toward the center of the wheel structure and provide for the attachment of the straps 10 which are formed in loops and adapted to be fastened to tightly draw the tie plates 4 and the sectional cover down upon the tire to be protected.

While I have shown this form of connection between each strap 10 and its pair of plates 4, it is obvious that various modifications may be made in this detail and that I am not to be limited to the precise form of connection herein shown if within the scope of the appended claims. In order to increase the friction of the bights of the looped straps 10 upon the yoke member 11 connected to the plates 4, the yoke may be provided with a roughened surface formed in any suitable manner, as, for instance, in the present case, by coiling around the body or shank of the yoke a layer of wire 13 forming the roughened surface in which the strap will seat and thus be held against free shifting movement as to the yoke.

While a single strap may be connected to a respective pair of plates 4 to draw the tire cover down snugly onto the tire to be protected, it is desirable, in order to prevent circumferential movement of the tire covering or protector as to the casing of the tire incased, to provide through one or more of the pairs of yokes or stirrups 11 a plurality of straps 10, as shown in the upper portion of Figs. 1 and 2, one of the straps being passed angularly toward and around one spoke of the wheel, and the other strap being passed in the opposite direction to embrace the next adjacent spoke, the straps being then tensioned up tightly and fastened by their buckles or other suitable fastening means as may be appropriate.

It will be seen, therefore, that my present tire protector or cover consists of a plurality of segments of worn or damaged tire casings, these segments being arranged in such position as to form a complete circle, preferably of such size as to most snugly embrace and incase the tire to be protected, and thus I provide for the utilization of this ordinarily wasted material. Further, the means provided for connecting and securely holding the sections in end abutting relation consists of comparatively inexpensive tie plates, preferably of metal, each of the plates being duplicate and therefore interchangeable and readily replaceable when worn or damaged after use, and also it will be seen that the connecting means for placing the tire cover under tension to bring it snugly into bearing contact on the surface of the tire to be protected consists of the straps 10, these being also comparatively inexpensive and providing for ready renewal and interchange, and giving ample latitude of adjustment as may be required.

If desired suitable means may be applied to positively embrace the wheel felly so as to prevent the lateral slipping of the tire cover on the incased tire, and detachable means may be utilized for this purpose. As shown in Figs. 3 and 5 a simple form of clamping device is disclosed and which embodies a substantially U-shaped clip 15 of metal or other suitable material, the upstanding limbs of which are adapted to overlap the sides of the felly and the central transverse portion of the clip is adapted to rest against the inner surface of the felly when the strap 10 is placed across the felly and through the yokes of the fastenings. The U-clip 15 may be attached to the strap 10 in any suitable manner, as, for instance, by a rivet 16 or a bolt, etc.

It is of course understood that when discarded tires are to be used to build up a tire cover that it will require the parts of two tires of a given size to cover another casing of the same size since in removing the damaged sections from the discarded or used tires this will shorten their circumference and the discarded section will be replaced by another section of proper length which will be inserted in the shoe to make a complete incasing cover for the tire to be protected.

What I claim is:

1. A pneumatic tire protecting cover consisting of a plurality of sections of tire casing for encircling the tire to be protected, the beads of the sections overlapping the sides of the tire, a pair of plates for connecting the section ends in abutting relation, bolts passing through a plate and section ends, hangers on said bolts, and means engaging a pair of hangers for securing the complete cover to the wheel on which the tire is mounted.

2. A tire protector including a number of segments sufficient to encircle and cover the tire to be protected, tie plates joining the ends of the sections, stirrups, bolts securing the plates to the casing and the stirrups to the plates, and adjustable means connected to said stirrups adapted to pass around the wheel felly on which the tire is mounted.

3. A tire protecting cover, consisting of a circle of segments of tire casing adapted to incase the tire, and means for joining said sections and securing them against relative movement on the tire and comprising tie plates in pairs at and bridging the abutting ends of the segments, devices for securing the plates to said sections, stirrups connected to said devices, and flexible, adjustable connections between the stirrups of each pair adapted to be secured around the felly of the wheel on which the tire is mounted, said connections including straps with fasteners.

4. A fastener for abutting ends of a tire protecting cover, comprising a pair of tie plates, U-shaped hangers having eyes at their ends, and bolts for securing said hangers to respective plates, said hangers adapted to receive means to be passed around a felly.

5. A fastener for abutting ends of a tire protecting cover, comprising a pair of tie plates, each having a lateral lip to bear upon the said cover, U-shaped hangers having eyes at their ends, and bolts for securing said hangers to respective plates, said hangers adapted to receive means to be passed around a felly.

In testimony whereof I affix my signature in presence of two witnesses.

DAVID URCH.

Witnesses:
 LILLIAN M. BURNHAM,
 MARION LANE.

Copies of this patent may be obtained for five cents each, by addressing the "Commissioner of Patents, Washington, D. C."